US012686182B2

(12) United States Patent
Samalot et al.

(10) Patent No.: US 12,686,182 B2
(45) Date of Patent: Jul. 21, 2026

(54) MULTIFUNCTIONAL PRESSURE PADS FOR INDUCTION WELDING

(71) Applicant: The Boeing Company, Chicago, IL (US)

(72) Inventors: Francis J. Samalot, St. Louis, MO (US); Pedro P. Martin, Madrid (ES); Yannick Buser, Overijssel (NL)

(73) Assignee: The Boeing Company, Arlington, VA (US)

( * ) Notice: Subject to any disclaimer, the term of this patent is extended or adjusted under 35 U.S.C. 154(b) by 1075 days.

(21) Appl. No.: 17/588,187

(22) Filed: Jan. 28, 2022

(65) Prior Publication Data

US 2022/0242057 A1 Aug. 4, 2022

Related U.S. Application Data

(60) Provisional application No. 63/143,669, filed on Jan. 29, 2021.

(51) Int. Cl.
B29C 65/00 (2006.01)
B29C 65/20 (2006.01)
(Continued)

(52) U.S. Cl.
CPC .......... B29C 66/8122 (2013.01); B29C 65/20 (2013.01); B29C 65/32 (2013.01);
(Continued)

(58) Field of Classification Search
CPC ..... B29C 65/32; B29C 65/36; B29C 66/8122; B29C 66/81261; B29C 66/81262;
(Continued)

(56) References Cited

U.S. PATENT DOCUMENTS 3,536,567 A * 10/1970 Harrison ........... B29C 66/81455
426/410
3,951,902 A * 4/1976 Jones ................... C08G 73/122
524/448

(Continued)

FOREIGN PATENT DOCUMENTS

CN 103534081 A 1/2014
JP H9162198 A 6/1997
(Continued)

OTHER PUBLICATIONS

Japan Patent Office, Office Action, App. No. 2022-010232 (Dec. 2, 2025).
(Continued)

*Primary Examiner* — John L Goff, II
(74) *Attorney, Agent, or Firm* — Walters & Wasylyna LLC

(57) ABSTRACT

A compression load distributor includes a support layer and a heat spreading layer. The support layer includes a flexible carrier configured to distribute a load from a compression load applying device. The heat spreading layer is coupled to and carried on the support layer, the heat spreading layer comprising a heat sink configured to transfer heat throughout the compression load distributor. The heat sink is thermally conductive and electrically non-conductive.

25 Claims, 10 Drawing Sheets

(51) Int. Cl.
  *B29C 65/32*     (2006.01)
  *B29L 31/30*     (2006.01)

(52) U.S. Cl.
  CPC .. *B29C 66/81261* (2013.01); *B29C 66/81262*
    (2013.01); *B29C 66/81611* (2013.01); *B29L*
    *2031/3076* (2013.01)

(58) Field of Classification Search
  CPC .......... B29C 66/81457; B29C 66/8183; B29C
      66/8187; B29C 66/81611; B29C
      2043/3655; B32B 37/26; B32B 2037/264;
      B32B 2037/266; F28F 3/00; F28D
      9/0087; B23K 13/01
  USPC ................................... 156/583.1, 323, 272.4
  See application file for complete search history.

(56)            References Cited

U.S. PATENT DOCUMENTS

| | | | | |
|---|---|---|---|---|
| 4,698,115 A | * | 10/1987 | Dodds ................. | B29C 43/3642 |
| | | | | 269/21 |
| 4,955,966 A | * | 9/1990 | Yuki .................. | A63B 37/0024 |
| | | | | 523/213 |
| 5,240,542 A | | 8/1993 | Miller et al. | |
| 5,955,177 A | * | 9/1999 | Sanocki .................. | C03C 25/42 |
| | | | | 442/178 |
| 6,096,817 A | * | 8/2000 | Mc Namara ............ | C08L 21/00 |
| | | | | 524/514 |

| | | | | |
|---|---|---|---|---|
| 6,414,847 B1 | * | 7/2002 | Hutchison ........... | H01L 23/3677 |
| | | | | 257/E23.113 |
| 2005/0061473 A1 | * | 3/2005 | Fletcher .................. | F28F 3/022 |
| | | | | 165/80.4 |
| 2010/0282410 A1 | * | 11/2010 | Pouchelon ............. | C09J 183/04 |
| | | | | 524/588 |
| 2021/0039326 A1 | * | 2/2021 | DiChiara .......... | B29C 66/91655 |
| 2021/0039327 A1 | * | 2/2021 | DiChiara .......... | B29C 66/91411 |
| 2021/0039328 A1 | * | 2/2021 | DiChiara ............ | B29C 66/1122 |
| 2021/0039329 A1 | * | 2/2021 | DiChiara ............ | B29C 66/3494 |
| 2021/0039332 A1 | * | 2/2021 | DiChiara .............. | B29C 66/131 |
| 2021/0039333 A1 | * | 2/2021 | DiChiara .......... | B29C 66/81831 |
| 2021/0039334 A1 | * | 2/2021 | DiChiara .............. | B29C 66/301 |

FOREIGN PATENT DOCUMENTS

| | | | |
|---|---|---|---|
| JP | 2008277408 A | | 11/2008 |
| JP | 2010503975 A | | 2/2010 |
| JP | 2017126714 A | | 7/2017 |
| JP | 2020533203 A | | 11/2020 |
| JP | 2021049776 A | | 4/2021 |
| UA | 30117 U | * | 2/2008 |

OTHER PUBLICATIONS

China National Intellectual Property Administration, Office Action,
App. No. 202111613860.9 (May 16, 2026).

\* cited by examiner

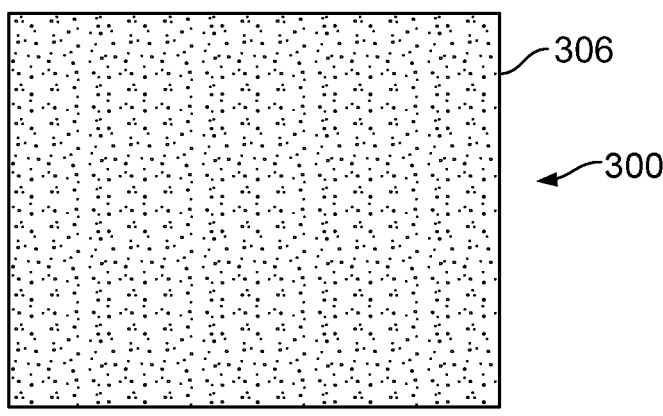
FIG. 3C
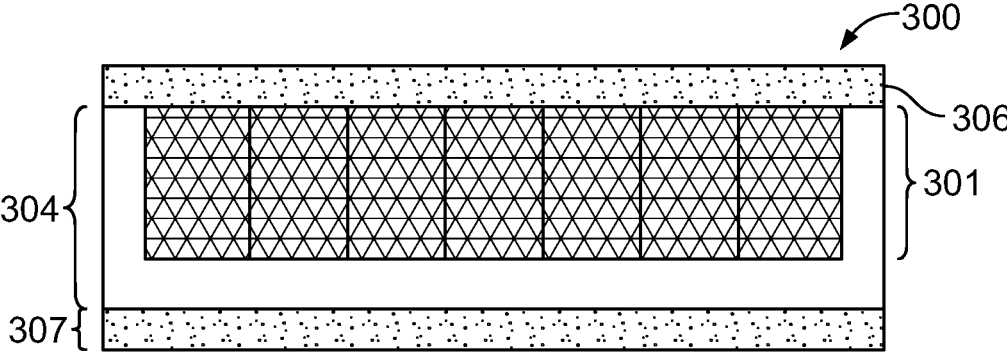
FIG. 3D
FIG. 4A

MULTIFUNCTIONAL PRESSURE PADS FOR INDUCTION WELDING

CROSS-REFERENCE TO RELATED APPLICATION

This application claims the benefit of and priority to U.S. Provisional Application No. 63/143,669, entitled "MULTI-FUNCTIONAL PRESSURE PADS FOR INDUCTION WELDING", filed Jan. 29, 2021, which is incorporated by reference herein in its entirety.

BACKGROUND

Induction welding uses electromagnetic induction to heat components without contacting the components. For example, two components can be welded together at a joint by induction welding and neither component is contacted by the induction welding coil itself. Induction welding is typically limited to configurations that maximize the heat profile at the weld interface while maintaining temperatures below deconsolidation on the rest of the components. Conventionally, heat is applied to the weld interface and removed from the coil side of the weld. Typically heat is transferred from the surface of the weldment nearest the coil and into a heat sink on the coil side of the weld to ensure proper thermal distribution. While welding occurs, the elements of the weldment are pressed together at the weld interface with compressive force applied at the side opposite to the coil. Accordingly, conventional welding systems do not provide mechanisms for removal of heat on the weld side opposite the coil side. This limits the thickness of components that can be induction welded and does not allow thinner components to be induction welded.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

In one implementation, a compression load distributor is provided. The compression load distributor includes a support layer and a heat spreading layer. The support layer includes a flexible carrier configured to distribute a load from a compression load applying device. The heat spreading layer is coupled to and carried on the support layer, the heat spreading layer comprising a heat sink configured to transfer heat throughout the compression load distributor, where the heat sink is thermally conductive and electrically non-conductive.

In another implementation, a compression load distributor is provided. The compression load distributor includes a flexible carrier and a plurality of platelets. The flexible carrier is configured to distribute a load from a compression load applying device. The plurality of platelets is embedded within the flexible carrier and configured to transfer heat throughout the flexible carrier. The plurality of platelets is thermally conductive and electrically non-conductive.

In another implementation, a compression load distributor is provided. The compression load distributor includes a support layer, a heat spreading layer, and a silicone rubber layer. The support layer includes a flexible carrier configured to distribute a load from a compression load applying device. The heat spreading layer is bonded to the support layer and includes a heat sink configured to transfer heat throughout the compression load distributor. The heat sink is thermally conductive and electrically non-conductive. The support layer is provided between the heat spreading layer and the silicone rubber layer.

In another implementation, a method for maintaining a weld line temperature during induction welding is provided. The method includes applying a weld temperature to a weld line, distributing, by a compression load distributor, a compression load across the weld line during the induction welding, applying the weld temperature while compressing the weld line together, and drawing off a welding heat to maintain a surface temperature of a surface being inducted welded lower than the weld temperature at the weld line.

In another implementation, an apparatus for induction welding is provided. The apparatus includes a weldable material comprising an induction weld site, an induction welding device on a welding side of the induction weld site, and a heat sink material including a welding surface proximate to a contact side of the induction weld site opposite the welding side. The weldable material is arranged between the induction welding device and the heat sink material.

In another implementation, a method for manufacturing a compression load distributor is provided. The method includes creating a mold, placing a heat spreading layer in the mold, the heat spreading layer comprising a heat sink configured to disperse heat, where the heat sink is thermally conductive and electrically non-conductive, applying an adhesion promoter on the heat spreading layer, applying a support layer on the adhesion promoter, the support layer comprising a flexible carrier configured to distribute a load, and curing the heat spreading layer, the adhesion promoter, and the support layer.

In another implementation, a method of distribution compression loading during induction welding is provided. The method includes receiving pressure from a compression force applying device, applying a load on components to be induction welding at a weld line, and distributing the applied load on the components to be induction welded using a compression load distributor.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates an induction welding configuration according to various implementations of the present disclosure;

FIGS. 2A-2C illustrate a pressure pad according to various implementations of the present disclosure;

FIGS. 3A-3D illustrate a pressure pad according to other various implementations of the present disclosure;

FIGS. 4A-4D illustrate a pressure pad according to other various implementations of the present disclosure;

FIG. 5 illustrates a pressure pad and compression load applying device according to various implementations of the present disclosure;

Corresponding reference characters indicate corresponding parts throughout the drawings. In FIGS. 1 to 11, the systems are illustrated as schematic drawings. The drawings may not be to scale.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

As described herein, in induction welding, heat is applied and removed from the coil side of components. Various implementations of the present disclosure provide a thermally conductive pressure pad, or compression load distributor, on the non-coil side of an induction welding site to ensure proper thermal distribution. In one example, the pressure pad, due to its thermally conductive nature, removes heat on the non-coil side and evenly distributes the pressure from a compression load applying device, such as an inflatable bladder or pressure bellow. During the induction welding operation, the pressure pad removes heat from the components being induction welded and distributes the heat along the pressure pad, which reduces the temperature of the induction welding surface and prevents deconsolidation at the weld line and/or surface defects. Additionally, the pressure pad allows for the welding of thinner components than currently available.

Figures 1, 2A, 2B:
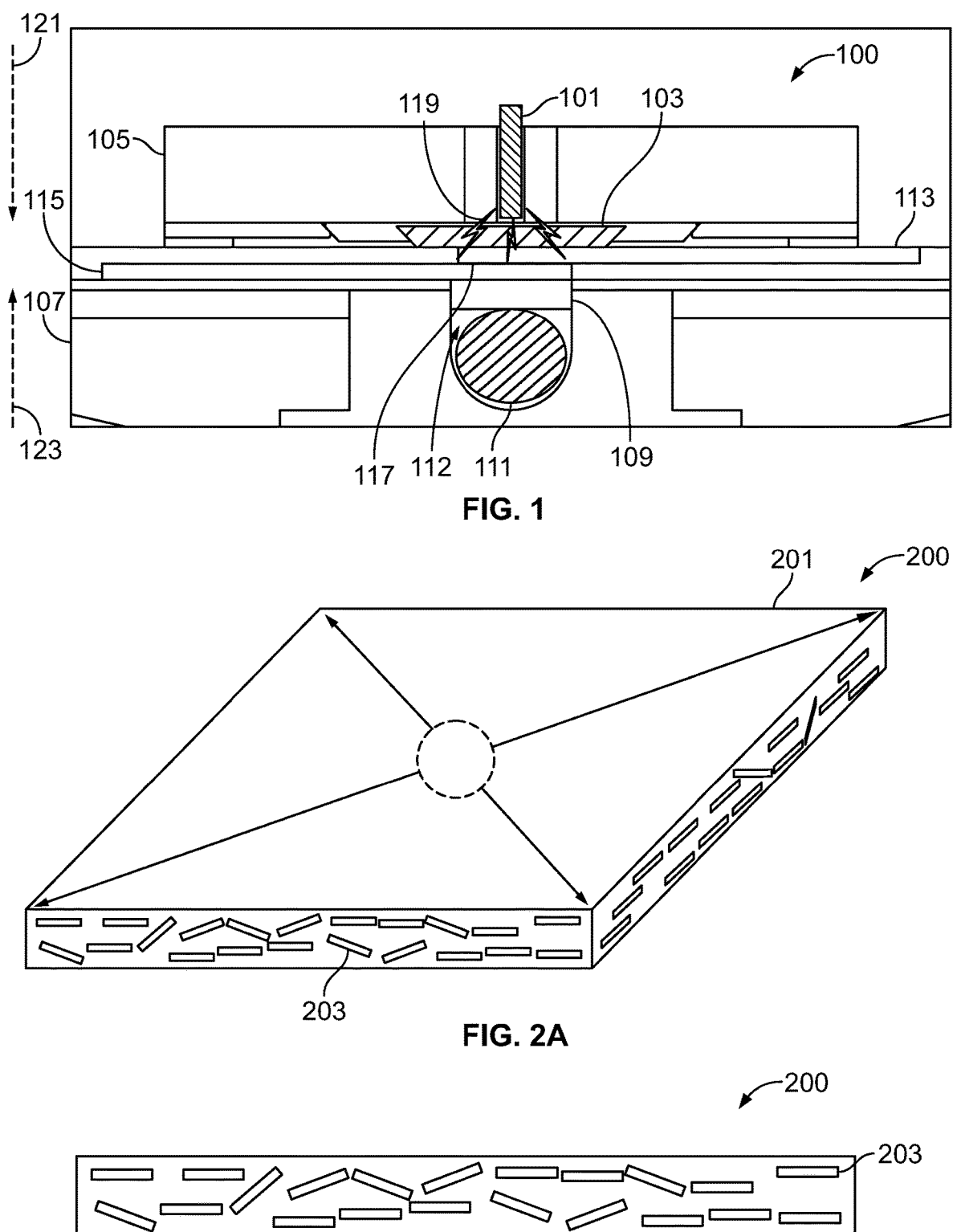

FIG. 1 illustrates an induction welding configuration according to various implementations of the present disclosure. The example of the induction welding configuration 100 is for illustration only. Other implementations of the induction welding configuration 100 can be used without departing from the scope of the present disclosure. That is, the present disclosure contemplates induction welding configurations having different shapes, sizes, configurations, etc.

The induction welding configuration 100 includes an induction welding coil 101, a heatsink 103, coil-side tooling 105, non-coil side tooling 107, a pressure pad 109, and a compression load applying device 111. The induction welding configuration 100 is configured to perform induction welding on two components 113, 115. The two components 113, 115 can be laminate, thermoplastic, composite, or any other material suitable for induction welding.

The induction welding coil 101 can be any type of coil operable to generate magnetic flux 119. That is, the induction welding coil 101 has a configuration to allow the two components 113, 115 to be induction welded, which in one example, includes using the induction welding coil 101 on only one side of the two components 113, 115. As shown in FIG. 1, the two components 113, 115 are illustrated simply for clarity, but can be any two components 113, 115 suitable for induction welding without departing from the scope of the present disclosure. The induction welding coil 101 is powered to operate at an induction welding frequency to induction weld the two components 113, 115 (e.g., provides voltage at a specified frequency, such as between 10 kHz and 1 MHz to-bond adjacent components). In one example, the two components 113, 115 are inductively heated at a weld interface 117 between the two components 113, 115 from a single thereof.

The induction welding coil 101 is placed on or above the heatsink 103 to perform induction welding. That is, the heatsink 103 is placed in contact with one of the two components 113, 115 to be induction welded and the induction welding coil 101. The heatsink 103 absorbs and disperses heat from the surface of the component 113 on which it is in contact as the two components 113, 115 are inducted welded. This ensures that heat generated within the two components 113, 115 at the weld interface 117 does not cause the surface contacted by the heat sink to exceed the transition temperature.

The coil-side tooling 105 and the non-coil side tooling 107 are configured to provide support for the induction welding configuration 100. In particular, the coil-side tooling 105 provides support to stabilize the induction welding coil 101, the heatsink 103, and the two components 113, 115 during the induction welding process. In some implementations, the coil-side tooling 105 provides a downward compressive force 121 on the heatsink 103 and the two components 113, 115 during the induction welding process to compress the two components 113, 115 together during induction welding to ensure a good weld of the weld interface 117. It should be appreciated that use of the term "downward" is used for reference only based on the perspective of FIG. 1 as shown, and the coil-side tooling 105 can provide a suitable stabilizing force in any direction based on the orientation of the induction welding configuration 100. In other implementations, the coil-side tooling 105 provides a hard backing pressure on which the two components 113, 115 are compressed by the compression load applying device 111 during the induction welding.

The non-coil side tooling 107 provides support to stabilize the two components 113, 115, the pressure pad 109, and the compression load applying device 111 during the induction welding process. In some implementations, the non-coil side tooling 107 provides an upward compressive force 123 on the two components 113, 115, the pressure pad 109, and the compression load applying device 111 to compress the two components 113, 115 against the heatsink 103 and coil-side tooling 105 during the induction welding process. It should be appreciated that use of the term "upward" is used for reference only based on the perspective of FIG. 1 as shown, and the non-coil side tooling 107 can provide a suitable stabilizing force in any direction based on the orientation of the induction welding configuration 100.

The compression load applying device 111 in one example is inflatable to apply a pressure to the two components 113, 115 during the induction welding process. In particular, the compression load applying device 111 reacts off of a holding cavity 112 and the non-coil side tooling 107 and against the two components 113, 115 and the coil-side tooling 105. The applied pressure provides a stabilizing and clamping force on the two components 113, 115 to aid with joining the weld interface 117. Movement of the two components 113, 115 during the induction welding process is undesirable. By applying the clamping force from the compression load applying device 111 during the induction welding process, the efficacy of the induction welding process is increased. In some implementations, the compression load applying device 111 is an inflatable bladder or pressure bellow that is inflated with air. However, other devices can be used. The amount of air pressure used to fill the compression load applying device 111 adjusts the amount of force applied by the compression load applying device 111. In other words, as the amount of air used to inflate the compression load applying device 111 increases, the amount of clamping force applied by the compression load applying device 111 on the weld interface 117 also increases, while the amount of air used to inflate the compression load applying device decreases, the amount of clamping force applied by the compression load applying device 111 on the weld interface 117 also decreases.

The pressure pad 109, also referred to herein as a compression load distributor, is provided opposite the induction welding coil 101 relative to the two components 113, 115. The pressure pad 109 is located between the compression load applying device 111 and the two components 113, 115. The pressure pad 109 provides heat removal from the two components 113, 115, and particularly the component 115, during the induction welding process. In other words, the pressure pad 109 functions as a heatsink to draw heat from the surface of the component 115 in which it contacts. Furthermore, due to the design of the pressure pad 109 and the materials used for construction, the pressure pad 109 evenly distributes force from the compression load applying device 111 by spreading out the compression load over a wider area than if only the compression load applying device 111 was used. By providing heat removal opposite of the induction welding coil 101, the pressure pad 109 allows passive thermal cooling during the induction welding process. The pressure pad 109 can be implemented as the pressure pad 200, the pressure pad 300, or the pressure pad 400. The construction of the pressure pad 109 will be described in greater detail below with reference to FIGS. 2A-4D.

Figures 2C, 3A, 3B:
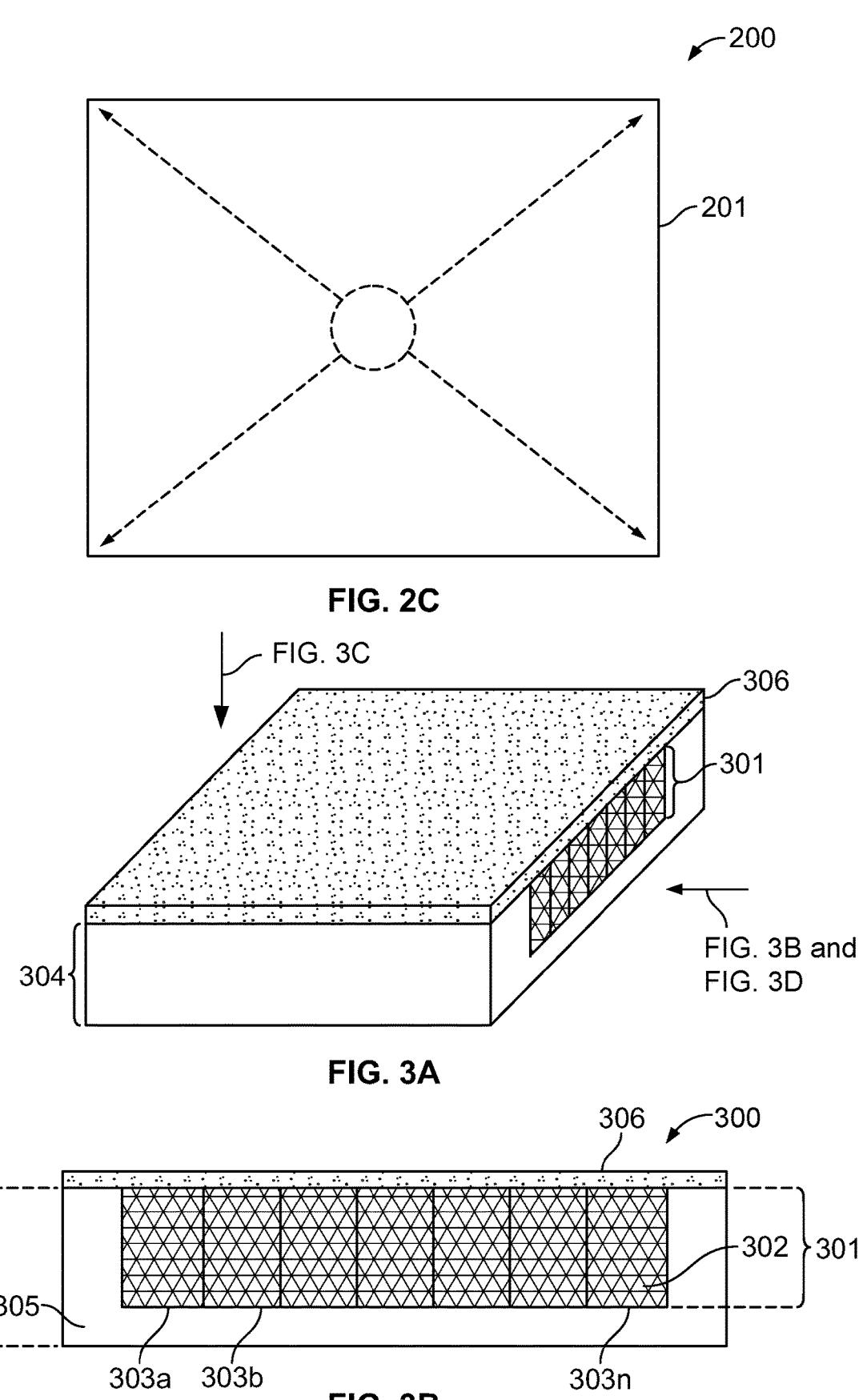

FIGS. 2A-2C illustrate a pressure pad 200, or compression load distributor, according to various implementations of the present disclosure. FIG. 2A illustrates a top perspective view of the pressure pad 200, FIG. 2B illustrates a side view of the pressure pad 200, and FIG. 2C illustrates a top view of the pressure pad 200. The example of the pressure pad 200 shown in FIGS. 2A-2C is for illustration only. Other implementations of the pressure pad 200 can be used without departing from the scope of the present disclosure. That is, the present disclosure contemplates pressure pads having different shapes, sizes, configurations, etc. In some implementations, the pressure pad 200 is embodied as the pressure pad 109 illustrated in FIG. 1.

In the illustrated example, the pressure pad 200 includes a carrier 201. The carrier 201 is a flexible carrier configured to distribute a load from the compression load applying device 111. The carrier 201 is formed from a flexible plate carrier with high thermal conductivity and minimal electrical conductivity. In some implementations, the flexible plate carrier is formed from a silicone rubber. In some implementations, the flexible plate carrier is formed from a glass fiber fabric. In some implementations, the flexible plate carrier is formed from a quartz fiber fabric or basalt fiber fabric. It should be appreciated that other materials can be used to fabricated the carrier 201. Also, as used herein, "formed from" includes any type of process that is used to form the part or element. That is, "formed" refers to "fabricating" the part or element from or of one or more materials or that the part or element is "made" from or of the one or more elements.

The pressure pad 200 further includes a plurality of platelets 203. The plurality of platelets 203 are embedded and distributed within the carrier 201. In one example, the plurality of platelets 203 are embedded within the carrier 201 and evenly distributed within the carrier 201. In one implementation, the plurality of platelets 203 are cooling filler platelets dispersed and aligned in-plane within the carrier 201 to increase a heat release capacity of the carrier 201. However, other distribution and spacing configurations can be used. In one example, the plurality of platelets 203 are thermally conductive and electrically non-conductive. In some implementations, the plurality of platelets 203 are ceramic and can be formed from, for example, aluminum nitride. In other implementations, the plurality of platelets 203 are formed from boron nitride (BN). In some implementations, the plurality of platelets are formed from a milled carbon fiber. And, due to the thermally conductive properties, each individual platelet of the plurality of platelets 203 conducts heat from the two components 113, 115. As such, with the plurality of platelets 203 being embedded and evenly distributed within the carrier 201, the heat from the two components 113, 115 is evenly distributed, or spread, throughout the carrier 201 during the induction welding process. More particularly, the plurality of platelets 203 thermally disperse heat from the magnetic flux applied to the two components 113, 115 by the induction welding coil 101.

FIG. 2B illustrates the plurality of platelets 203 embedded within the carrier 201. As shown in FIG. 2B, the plurality of platelets 203 are evenly, or substantially evenly distributed throughout the body (height, length, and width) of the carrier 201. Each of the plurality of platelets 203 is embedded in the carrier 201 substantially parallel to the surface of the carrier 201. As described above, the carrier 201 comprises a material, such as aluminum nitride or boron nitride, with high thermal conductivity. The substantially parallel orientation of the plurality of platelets 203 within the carrier 201, combined with the even distribution throughout the carrier 201, increases the distribution of heat throughout the carrier 201 and reduces the likelihood of a "hot spot" in the carrier 201. A "hot spot", as used herein, is an area of the carrier 201 without even distribution of heat. By distributing the heat throughout the carrier 201 and avoiding a hot spot, the efficacy of the weld is increased.

FIGS. 3A-3D illustrate a pressure pad 300, or compression load distributor, according to various implementations of the present disclosure. FIG. 3A illustrates a top perspective view of the pressure pad 300, FIG. 3B illustrates a side view direction of the pressure pad 300 illustrated in FIG. 3A, FIG. 3C illustrates a top view direction of the pressure pad 300 illustrated in FIG. 3A, and FIG. 3D illustrates a side view direction of the pressure pad 300 illustrated in FIG. 3A with an additional silicone rubber layer 307. The example of the pressure pad 300 in FIGS. 3A-3D is for illustration only. Other implementations of the pressure pad 300 can be used without departing from the scope of the present disclosure. That is, the present disclosure contemplates pressure pads having different shapes, sizes, configurations, etc. For examples, the pressure pad 200 has a different configuration than the pressure pad 300 and the pressure pad 400 as described below. In some implementations, the pressure pad 300 is embodied as the pressure pad 109 illustrated in FIG. 1.

The pressure pad 300 includes a heat spreading layer 301 and a support layer 304. The heat spreading layer 301 is coupled to and carried on the support layer 304 and includes a heatsink 302 comprising a plurality of ceramic tiles 303 that distributes heat throughout the pressure pad 300. More particularly, the heatsink 302 thermally disperses heat from the magnetic flux applied to the two components 113, 115 by the induction welding coil 101. The heatsink 302 is formed from a material that is thermally conductive and electrically non-conductive. In other words, the heatsink 302 is heated only by conductive heat transfer from the surface on which it is in contact, such as the component 115. The heatsink 302 is not directly heated, inductively or otherwise, as the heatsink 302 is unaffected by the magnetic flux. The heatsink 302 draws in heat by conduction by touch from a component to be induction welded that is in contact with the pressure pad 300. In some implementations, the heatsink 302 includes a plurality of ceramic tiles 303a-n to maintain a measure of flexibility, rather than a single ceramic tile. The measure of flexibility aids in maintaining better contact with a component to be inducted welded, such as one of the components 113, 115.

For example, as shown in FIG. 3B, the heatsink 302 includes seven ceramic tiles 303a, 303b, through 303n. Although shown in FIG. 3B as including seven ceramic tiles 303, the heatsink 302 can include any number of ceramic tiles 303 for suitable heat distribution throughout the pressure pad 300. In some implementations, the ceramic tiles 303 are formed from aluminum nitride. In other implementations, the ceramic tiles 303 are formed from boron nitride (BN). The heat spreading layer 301 is rigid in some examples. Due to the rigidity, multiple ceramic tiles 303n are provided with small gaps between the ceramic tiles 303n to maintain a measure of flexibility. Although the heat spreading layer 301 as a whole is rigid in some examples, a small measure of flexibility is desired in order to potentially flex with the component 115. It should be appreciated that the size, shape, configuration (e.g., single rows or multiple rows), spacing, etc. of the ceramic tiles 303n can be varied as desired or needed. In some examples, cross sectional properties (e.g., a thickness) of at least one of the support layer 304 and the heat spreading layer 301 vary longitudinally, which in turn can vary the rigidity of the pressure pad 300 or heat spreading properties of the pressure pad 300.

The support layer 304 includes a carrier 305 that distributes a load from the compression load applying device 111. The carrier 305 can be a flexible plate carrier. In some implementations, the flexible plate carrier is formed from a silicone rubber. In some implementations, the flexible plate carrier is formed from a glass fiber fabric. In some implementations, the flexible plate carrier is formed from a quartz fiber fabric or basalt fiber fabric. In some implementations, the plate carrier is more rigid and formed from polyetheretherketone (PEEK). In other implementations, the plate carrier is more rigid and formed from polyetherketoneketone (PEKK). It should be appreciated that a combination of material can be used. For example, the flexible plate carrier in some implementations is formed from a combination of PEKK and PEEK. In some implementations, the carrier 305 is coupled to the compression load applying device 111 and the bottom of the ceramic tiles 303 are bonded, such as bottom-bonded (using any suitable bonding material), to the carrier 305 in a configuration to maintain an arrangement of the ceramic tiles 303 on the carrier 305 to define a semi-rigid pad. The bonded ceramic tiles 303 of the semi-rigid pad provide the structural support for the pressure pad 300 to evenly distribute a load applied from the compression load applying device 111 during the induction welding process.

In some implementations, the ceramic tiles 303 are blocks, the faces of which are planar or substantially planar. Due to the amount of surface area of the ceramic tiles 303 in contact with the component 115 during the induction welding process, the heatsink 302 distributes, or dissipates, and releases heat efficiently by conductively transferring heat from the component 115 to the heatsink 302. In some implementations, the heatsink 302 is in direct contact with the component 115 during the induction welding process. In this implementation, the heatsink 302 does not have an air gap insulating it from the component 115, which could interfere with the conductive heat transfer process and load distribution. In other implementations, such as illustrated in FIG. 3A, the pressure pad 300 further includes a film 306 provided on (e.g., coupled or bonded to) the heatsink 302 and the carrier 305 that is in contact with the component 115 during the induction welding process. The film 306 in one example is a polyimide film that prevents the deformation of the carrier 305 as the load is applied from the compression load applying device 111, which in turn can cause imprinting on the component 115. The film 306 can have a thickness of less than five millimeters thick, less than three millimeters thick, or less than two millimeters thick. Other thicknesses are contemplated by the present disclosure.

In some implementations, the heat spreading layer 301 formed by the plurality of ceramic tiles 303 which define a heatsink 302, the support layer 304 formed by the carrier 305, and the film 306 (in implementations where applicable) are applied in turn as a liquid and then cured until substantially rigid in order to form the pressure pad 300. In some implementations, the support layer 304 is machined. In some implementations, the film 306 is applied as a bonded film. The manufacturing process of the pressure pad 300 will be described in greater below with reference to FIG. 6. After the heatsink 302, the carrier 305, and the film 306 (in implementations where applicable) are applied and cured, the pressure pad 300 is formed as shown in FIGS. 3A-3C. As illustrated in FIGS. 3A and 3B, the support layer 304 is provided on three sides, i.e. the front, back, and bottom sides in the perspective of FIGS. 3A and 3B, of the heatsink 302. In other words, the carrier 305 is generally U-shaped and the heatsink 302 of the heat spreading layer 301 are embedded in the middle area of the carrier 305 such that the carrier 305 supports each side of the heatsink 302 except the top side.

In some implementations, the pressure pad 300 includes an additional silicone rubber layer 307 provided on (e.g., coupled or bonded to) the support layer 304. In these implementations, as shown in FIG. 3D, the silicone rubber layer 307 is provided adjacent to or abutting the support layer 304 such that the silicone rubber layer 307 is in contact with the compression load applying device 111 during the induction welding process. The silicone rubber layer 307 acts as an additional support layer for the compression load applying device 111 to increase the rigidity of the pressure pad 300, aiding in the compression load transfer from the compression load applying device 111 over a wider area, and to reduce the chances of the compression load applying device 111 pinching the pressure pad 300 during the induction welding process. The silicone rubber layer 307, by reducing the chances of the compression load applying device 111 pinching, the silicone rubber layer 307 provides a desirable surface for contact with a component to be induction welded and, in turn, distributes a compression load over a wider and more consistent area. In some implementations, the silicone rubber layer 307 is less rigid, i.e., more flexible, than the support layer 304 and is able to conform to the shape and structure of the compression load applying device 111 more closely. In one implementation, the silicone rubber layer 307 is a silicone rubber base that, when cured, is firm yet flexible, has a high inhibition resistance, good cut growth resistance, and low shrinkage. In particular, the silicone rubber layer 307 can withstand the temperatures being conductively transferred to the pressure pad 300 during the induction welding process and is rigid enough to help distribute the load from the compression load applying device 111 yet flexible enough to provide a desirable interface with the compression load applying device 111. Furthermore, the amount of rigidity of the pressure pad 300 also aids in forming a shape complementary to the components to be induction welded and distributing the contact points of the components to be induction welded over a wider area. In some implementations, the silicone rubber layer 307 can be a dow Silastic™ RTV-4136-M base beige 20.4 KG pail or an RTV-2 silicone rubber, but the present disclosure contemplates any suitable silicone rubber layer with sufficient firmness, flexibility, and resistance properties as described herein.

Figures 4B, 4C, 4D, 5:
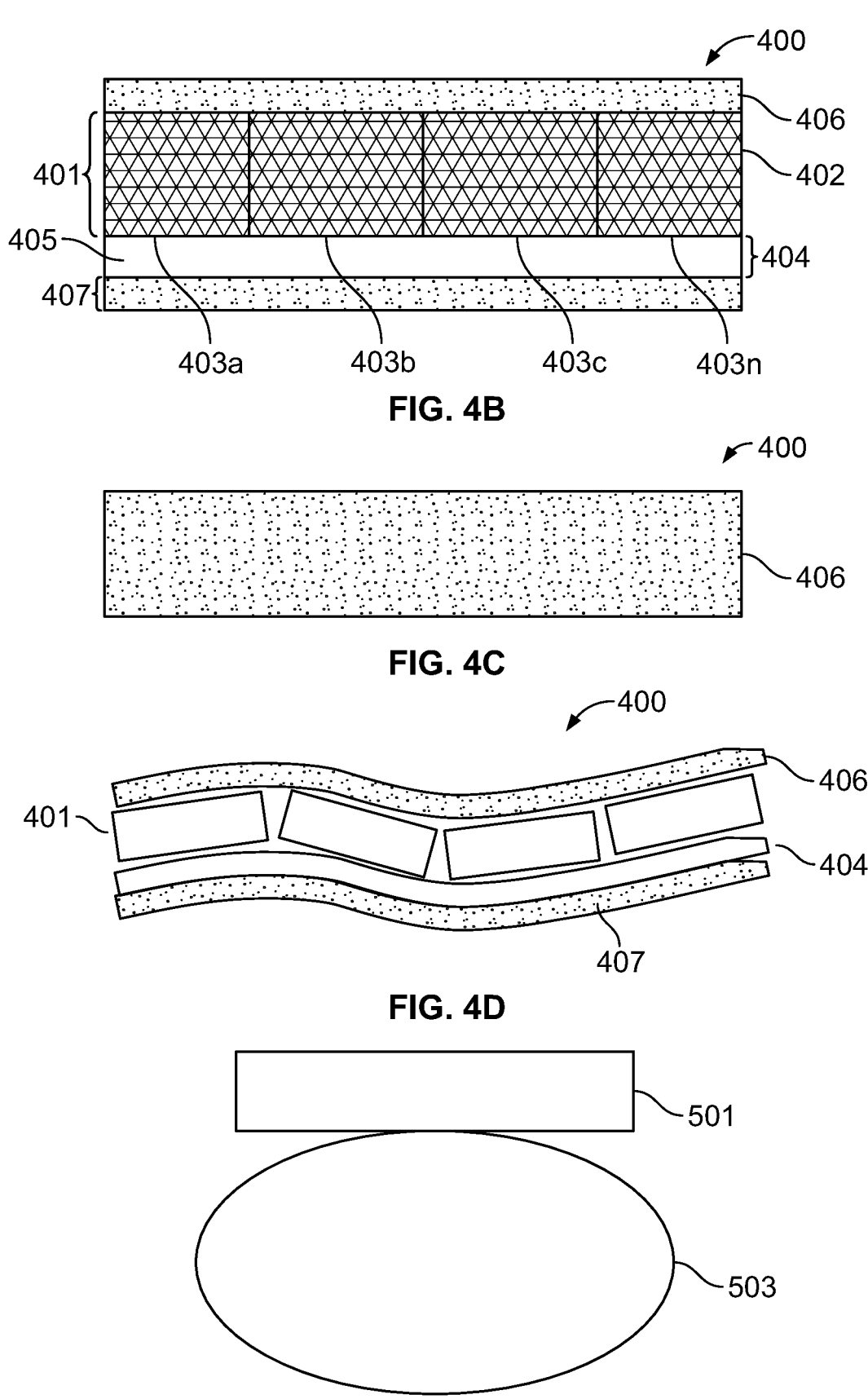

FIGS. 4A-4D illustrate a pressure pad 400, or compression load distributor, according to various implementations of the present disclosure. FIG. 4A illustrates a top perspective view of the pressure pad 400, FIG. 4B illustrates a side view direction of the pressure pad 400 illustrated in FIG. 4A, FIG. 4C illustrates a top view direction of the pressure pad 400 illustrated in FIG. 4A, and FIG. 4D illustrates a side view direction of the pressure pad 400 illustrated in FIG. 4A that shows the flexibility of the pressure pad 400. The example of the pressure pad 400 in FIGS. 4A-4D is for illustration only. Other implementations of the pressure pad 400 can be used without departing from the scope of the present disclosure. That is, the present disclosure contemplates pressure pads having different shapes, sizes, configurations, etc. In some implementations, the pressure pad 400 is the pressure pad 109 illustrated in FIG. 1.

The pressure pad 400, or compression load distributor, includes a heat spreading layer 401, a support layer 404, and a silicone rubber layer 407. The heat spreading layer 401 includes a heatsink 402 comprising a plurality of ceramic tiles 403 that distributes heat throughout the pressure pad 400. More particularly, the heatsink 402 thermally disperses heat from the magnetic flux applied to the two components 113, 115 by the induction welding coil 101. The heatsink 402 is formed of material that is thermally conductive and electrically non-conductive. In other words, the heatsink 402 is heated only by conductive heat transfer from the surface on which it is in contact, such as the component 115. The heatsink 402 is not directly heated, inductively or otherwise, as the heatsink 402 is unaffected by the magnetic flux. The heatsink 402 draws in heat by conduction by touch from a component to be induction welded that is in contact with the pressure pad 400. In some implementations, the heatsink 402 includes a plurality of ceramic tiles 403a-n to maintain a measure of flexibility, rather than a single ceramic tile. The measure of flexibility aids in maintaining better contact with a component to be inducted welded, such as one of the components 113, 115.

For example, as shown in FIG. 4B, the heatsink 402 includes four ceramic tiles 403a, 403b, through 403n. Although shown in FIG. 4B as including four ceramic tiles 403, the heatsink 402 can include any number of ceramic tiles 403 for suitable heat distribution throughout the pressure pad 400. In some implementations, the ceramic tiles 403 are formed from aluminum nitride. In other implementations, the ceramic tiles 403 are formed from boron nitride (BN). The heat spreading layer 401 is rigid in some examples. Due to the rigidity, multiple ceramic tiles 403 are provided with small gaps between the ceramic tiles 403 to maintain a measure of flexibility. Although the heat spreading layer 301 as a whole is rigid in some examples, a small measure of flexibility is desired in order to potentially flex with the component 115. It should be appreciated that the size, shape, configuration (e.g., single rows or multiple rows), spacing, etc. of the ceramic tiles 403 can be varied as desired or needed. In some examples, cross sectional properties (e.g. a thickness) of at least one of the support layer 404 and the heat spreading layer 401 vary longitudinally, which in turn can vary the rigidity of the pressure pad 300 or heat spreading properties of the pressure pad 300.

The support layer 404 includes a carrier 405 that distributes a load from the compression load applying device 111. The carrier 405 can be a flexible plate carrier. In some implementations, the flexible plate carrier is formed from a silicone rubber. In some implementations, the flexible plate carrier is formed from a glass fiber fabric. In some implementations, the flexible plate carrier is formed from a quartz fiber fabric or basalt fiber fabric. In some implementations, the plate carrier is more rigid and formed from PEEK, PEKK, or a combination thereof. The carrier 405 is coupled to the compression load applying device 111 and the bottom of the ceramic tiles 403 are bonded to the carrier 405 in a configuration to maintain the arrangement of the ceramic tiles 403 on the carrier 405 to define a semi-rigid pad in the illustrated example. The bonded ceramic tiles 403 of the semi-rigid pad provide the structural support for the pressure pad 400 to evenly distribute a load applied from the compression load applying device 111 during the induction welding process.

In some implementations, the ceramic tiles 403 are blocks, the faces of which are planar or substantially planar. Due to the amount of surface area of the ceramic tiles 403 in contact with the component 115 during the induction welding process, the heatsink 402 distributes and releases heat efficiently by conductively transferring heat from the component 115 to the heatsink 402.

As illustrated in FIG. 4A, the pressure pad 400 further includes a film 406 provided on (e.g., coupled or bonded to) the heatsink 402 that is in contact with the component 115 during the induction welding process. The film 406, in one example, is a polyimide film that prevents the deformation of the component 115 as the load is applied from the compression load applying device 111, which in turn can cause imprinting on the component 115. The film 406 can have a thickness of less than five millimeters thick, less than three millimeters thick, or less than two millimeters thick. Other thicknesses are contemplated by the present disclosure.

The pressure pad 400 further includes a silicone rubber layer 407 provided on (e.g., coupled or bonded to) the support layer 404 such that the silicone rubber layer 407 is in contact with the compression load applying device 111 during the induction welding process. The silicone rubber layer 407 acts as an additional support layer for the compression load applying device 111 to increase the rigidity of the pressure pad 400, aiding in the compression load transfer from the compression load applying device 111 over a wider area, and to reduce the chances of the compression load applying device 111 pinching the pressure pad 400 during the induction welding process. The silicone rubber layer 407, by reducing the chances of the compression load applying device 111 pinching, the silicone rubber layer 407 provides a desirable surface for contact with a component to be induction welded and, in turn, distributes a compression load over a wider and more consistent area. In some implementations, the silicone rubber layer 407 is less rigid, i.e., more flexible, than the support layer 404 and is able to conform to the shape and structure of the compression load applying device 111 more closely. In one implementation, the silicone rubber layer 407 is a silicone rubber base that, when cured, is firm yet flexible, has a high inhibition resistance, good cut growth resistance, and low shrinkage. In particular, the silicone rubber layer 407 can withstand the temperatures being conductively transferred to the pressure pad 400 during the induction welding process and is rigid enough to help distribute the load from the compression load applying device 111 yet flexible enough to provide a desirable interface with the compression load applying device 111. Furthermore, the amount of rigidity of the pressure pad 400 also aids in forming a shape complementary to the components to be induction welded and distributing the contact points of the components to be induction welded over a wider area. In some implementations, the silicone rubber layer 407 can be a dow Silastic™ RTV-4136-M base beige 20.4 KG pail or an RTV-2 silicone rubber, but the present disclosure contemplates any suitable silicone rubber layer with sufficient firmness, flexibility, and resistance properties as described herein.

In some implementations, the heat spreading layer 401, the support layer 404, the film 406, and, in some implementations, the silicone rubber layer 407 are applied in turn as a liquid and then cured until substantially rigid in order to form the pressure pad 400. In some implementations, the support layer 404 is machined. In some implementations, the film 406 is applied as a bonded film. The manufacturing process of the pressure pad 400 will be described in greater below with reference to FIG. 6. After the heat spreading layer 401, the support layer 404, and the film 406 (in implementations where applicable) are applied and cured, the pressure pad 400 is formed as shown in FIGS. 4A-4D. As illustrated in FIGS. 4A and 4B, and in contrast to the pressure pad 300, the support layer 404 is provided on one side of the heat spreading layer 401. In other words, the support layer 404 supports one side of the heat spreading layer 401. As shown in FIGS. 4A-4D, the pressure pad 400 increases the contact area of the heatsink 402 by covering the entire pressure pad 400 and increasing heat release capacity over current solutions.

In some implementations, the silicone rubber in the support layer 404 and/or silicone rubber layer 407 are components of a curing solution. For example, the silicone rubber can be a two-component silicone rubber layer including a base. The base can be the silicone rubber while the curing agent acts as the catalyst to vulcanize, or cure, the pressure pad 400. Other configurations are contemplated, such as using different solutions.

FIG. 4D illustrates the flexibility of the pressure pad 400. Due to the use of multiple ceramic tiles 403, and a small gap between each of the ceramic tiles 403, the pressure pad 400 has increased flexibility. Each of the heat spreading layer 401, the support layer 404, the film 406, and the silicone rubber layer 407 have some degree of flexibility, illustrated in FIG. 4D, which allows the pressure pad 400 to be applied and used for the two components 113, 115 that are not substantially flat or planar. In some implementations, the ceramic tiles 403 are embedded in the support layer 404, as opposed to bonded to the support layer 404, in order to further increase the flexibility of the pressure pad 400.

FIG. 5 illustrates a pressure pad 501, or compression load distributor, and compression load applying device 503 according to various implementations of the present disclosure. The examples of the pressure pad 501 and compression load applying device 503 in FIG. 5 are for illustration only. Other implementations of the pressure pad 501 and compression load applying device 503 can be used without departing from the scope of the present disclosure. That is, the present disclosure contemplates pressure pads and compression load applying devices having different shapes, sizes, configurations, etc.

In some implementations, the pressure pad 501 can be embodied as any one of the pressure pad 109, the pressure pad 200, the pressure pad 300, or the pressure pad 400. In some implementations, the compression load applying device 503 can be the compression load applying device 111. As shown in FIG. 5, the compression load applying device 503 can be an elliptical cross-section of an elongated structure. As the compression load applying device 503 is inflated with air, the compression load applying device 503 expands and applies pressure to the pressure pad 501. The pressure applied to the pressure pad 501 moves the pressure pad 501 in a direction away from the compression load applying device 503. In other words, as the compression load applying device 503 is inflated, the compression load applying device 503 pushes against a holding structure thus resulting in a compression force being applied to the component 115 during the induction welding process.

For example, when implemented in the induction welding configuration 100 shown in the FIG. 1, the pressure from the compression load applying device 503 moves the pressure pad 501 toward the two components 113, 115. The pressure pad 501 gradually applies more pressure on the two components 113, 115 as the compression load applying device 503 continues to fill with air. As the pressure pad 501 gradually applies more pressure on the two components 113, 115, the load of the compression load applying device 503 is distributed across the pressure pad 501 instead of being concentrated in a single contact point with the two components 113, 115. For example, the pressure pad 501 is configured to bend or conform to the shape of the compression load applying device 503 as described in more detail herein.

Figure 6:
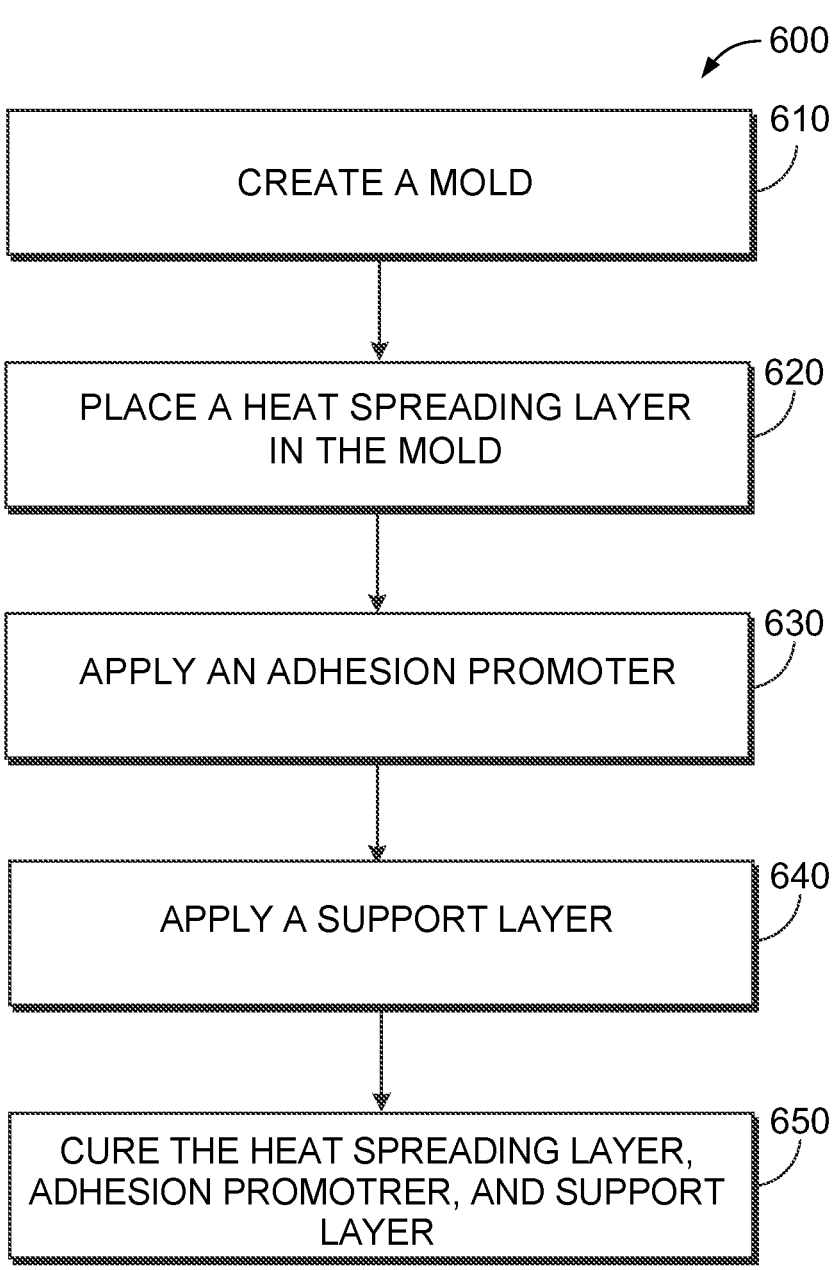
FIG. 6 illustrates a method of manufacturing a pressure pad according to various implementations of the present disclosure.

FIG. 6 illustrates a method of manufacturing a pressure pad according to various implementations of the present disclosure. The method 600 can be implemented by an electronic device, such as the induction welding system 900 illustrated in FIG. 9 below, or by any other suitable device. Various implementations of the method 600 can be performed without departing from the scope of the present disclosure.

In operation 610, a mold is created. The mold allows the elements of a pressure pad, such as the pressure pad 109, to be placed in the mold and cured together. The mold can be of any material suitable for maintaining a molding shape in the desired temperature range during cooling and curing of the elements of the pressure pad. In some implementations, the mold is configurable to create a pressure pad in various shapes and sizes depending on the size of the compression load applying device 111 to be used with the pressure pad, the size of the two components 113, 115 to be welded using the pressure pad, the shape of the two components 113, 115 to be welded using the pressure pad, the amount of heat to be drawn off of the two components 113, 115 during the induction welding, etc. For example, a component 115 with a more pronounced curve requires a pressure pad with greater flexibility to accommodate the curve of the component 115. A mold for a pressure pad with greater flexibility can include any one of a larger support layer, a thinner heat spreading layer, smaller ceramic tiles in the heat spreading layer, larger gaps between the ceramic tiles in the heat spreading layer, or other configurations that provide greater flexibility.

In operation 620, a heat spreading layer 301, 401 is placed in the mold. The heat spreading layer can be the heat spreading layer 301 or the heat spreading layer 401 and can include the heatsink 302 or the heatsink 402, respectively. For example, the ceramic tiles 303 or 403 can be placed in the mold. In various implementations, the heat spreading layer 301, 401 can include ceramic tiles 303 or 403 comprising aluminum nitride or boron nitride.

In operation 630, an adhesion promoter is applied to the heat spreading layer 301, 401. The adhesion promoter, or bonding promoter, can be any suitable adhesion promoter that provides sufficient adhesion between the heat spreading layer 301, 401 and the support layer 304, 404 without interfering with the particular electrical properties, i.e. electrical invisibility, and thermal properties of each layer. For example, any adhesion promoter that maintains the thermal conductivity and electrical non-conductivity of the heat spreading layer 301, 401 and provides sufficient adhesion can be used.

In operation 640, a support layer 304, 404 is placed in the mold on the adhesion promoter. The support layer can be the support layer 304 or the support layer 404 and can include the carrier 305 or the carrier 405, respectively. In various implementations, the support layer 304, 404 includes one or more of a glass fiber, quart fiber, basalt fiber, PEEK, or PEKK. The support layer 304, 404 is placed, or poured, into the mold as a liquid to conform to the shape of the mold.

In operation 650, the heat spreading layer 301, 401, the adhesion promoter, and the support layer 304, 404 are cured in the mold. The heat spreading layer 301, 401, the adhesion promoter, and the support layer 304, 404 can be cured by cooling in the mold or any other suitable method.

Although described herein as a series of steps, additional steps can be performed, steps can be removed, or steps can be performed in a different order without departing from the scope of the present disclosure. In some implementations, a polyimide film, such as the film 306 or 406, is placed in the mold prior to the heat spreading layer 301, 401 being placed in the mold. In other implementations, the film 306 or 406 is placed on the heat spreading layer 301, 401 after the heat spreading layer 301, 401 has been coupled to the support layer 304, 404. In implementations where an additional support layer is used, such as the silicone rubber layer 407 in the pressure pad 400, prior to curing an additional adhesion promoter is placed on the support layer 304, 404 and the silicone rubber layer 407 is spread in the mold on the adhesion promoter. Then, once each layer has been placed in the mold, the layers are then cured.

Figure 7:
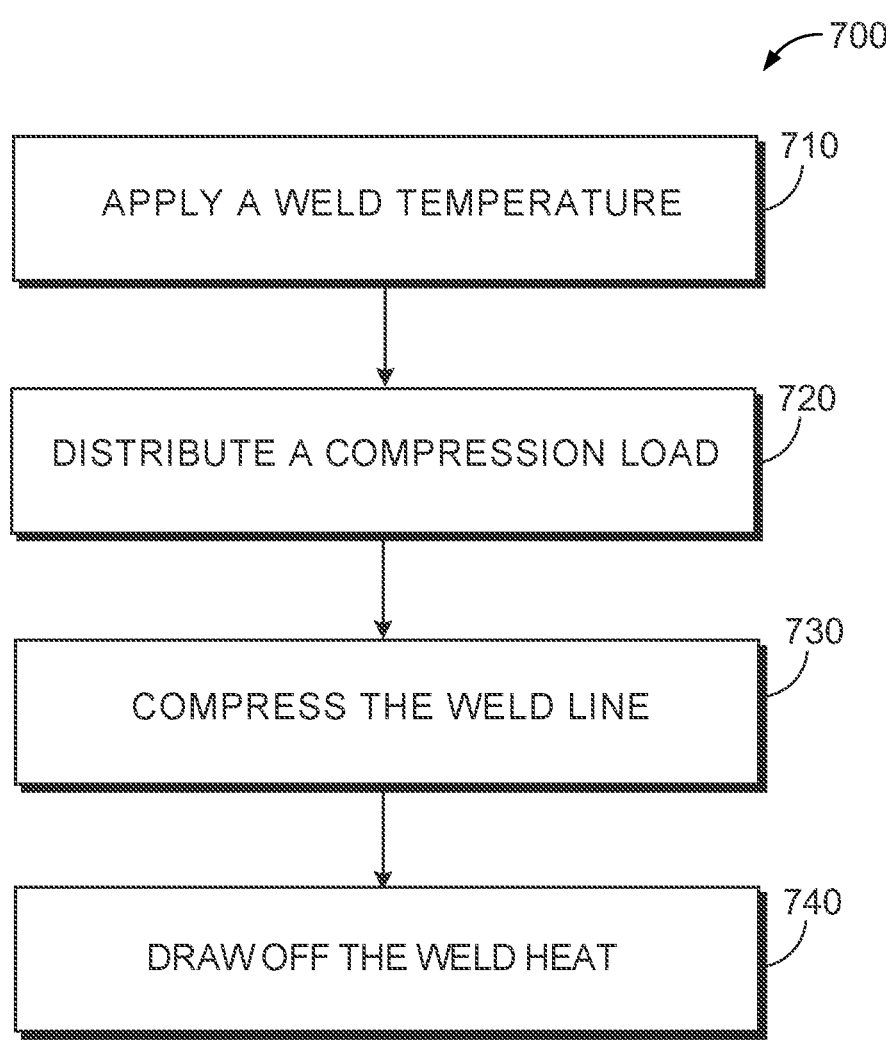
FIG. 7 illustrates a method of maintaining a weld temperature during induction welding according to various implementations of the present disclosure.

FIG. 7 illustrates a method of maintaining a weld temperature during induction welding according to various implementations of the present disclosure. The method 700 can be implemented by the induction welding configuration 100 or by any other suitable system. Various implementations of the method 700 can be performed without departing from the scope of the present disclosure.

In operation 710, a weld temperature is applied. The weld temperature is applied at a weld line between two components, such as the two components 113, 115. In one implementation, the weld temperature at the weld interface 117 between the two components 113, 115 is achieved through induction. In operation 720, a compression load is distributed across the weld line during the induction welding process. In some implementations, the compression load is distributed by a compression load distributor such as any one of the pressure pad 109, the pressure pad 200, the pressure pad 300, or the pressure pad 400. In operation 730, the weld line is compressed while applying the weld temperature. In operation 740, the welding heat is drawn off of the two components 113, 115 being induction welded to maintain a surface temperature at the weld interface 117 of the two components 113, 115. In other words, the heat is conductively transferred from a surface of one of the two components 113, 115 to ensure the surface is not overheated, while the weld temperature is maintained at the weld interface 117. In particular, the welding heat is drawn off by a heat spreading mechanism of the compression load distributor. For example, in the pressure pad 200, the plurality of platelets 203 draw off and disperse the weld heat. In the pressure pad 300, the heatsink 302 draws off and disperses the weld heat. In the pressure pad 400, the heatsink 402 draws off and disperses the weld heat.

Figure 8:
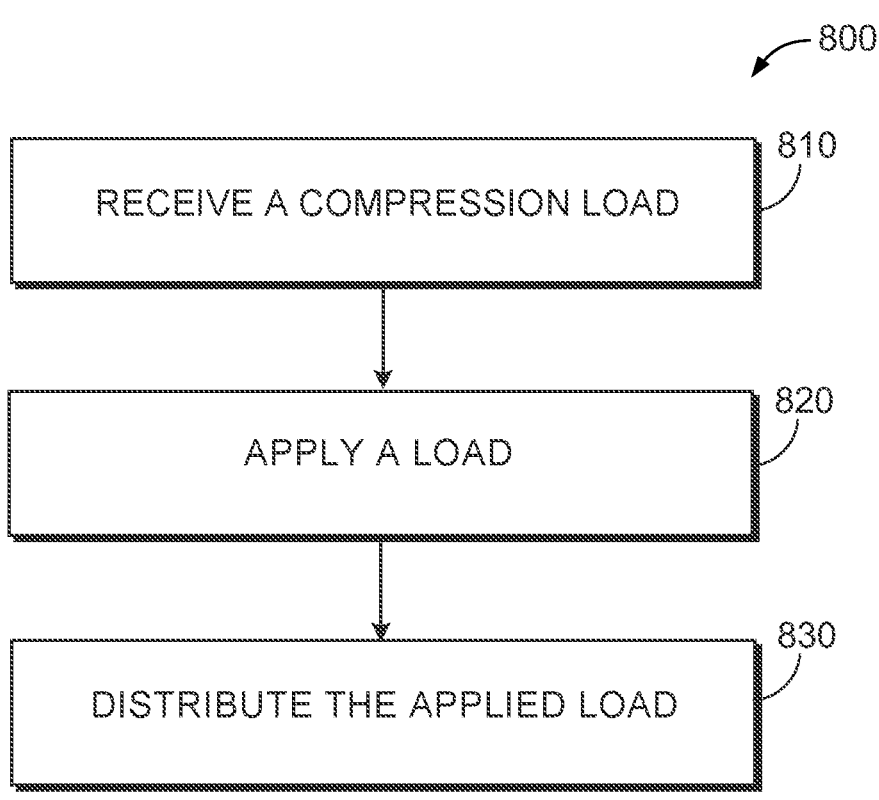
FIG. 8 illustrates a method of distributing a compression load during induction welding according to various implementations of the present disclosure.

FIG. 8 illustrates a method of distributing a compression load during induction welding according to various implementations of the present disclosure. The method 800 can be implemented by the pressure pad 109, pressure pad 200, pressure pad 300, or pressure pad 400 illustrated in FIG. 1, 2, 3, or 4, respectively. Various implementations of the method 800 can be performed without departing from the scope of the present disclosure.

In operation 810, a compression load is received from the compression load applying device 111. For example, the compression load applying device 111 is placed in the holding cavity 112 and as the compression load applying device 111 is inflated, a corresponding amount of pressure is applied to the pressure pad 109 due to the inflation. The compression load applying device 111 can be inflated with any suitable gas to apply pressure to the pressure pad 109. For example, the compression load applying device 111 can be inflated with air from a surrounding environment, nitrogen, or any other inert gas. In operation 820, a compression load is applied to components, such as the two components 113, 115, to be induction welded. The pressure pad 109 applies the load to the two components 113, 115 at the weld line. In operation 830, the pressure pad 109 distributes the applied load on the two components 113, 115. In particular, a support layer of the pressure pad 109 distributes the applied load based on the footprint of the pressure pad 109 over a wider area than if using the compression load applying device 111. The elongated structure of the compression load applying device 111 provides less surface area to apply the compression load. By using the pressure pad 109 to distribute the compression load, which has a larger surface area and footprint due to the support layer, the pressure pad 109 distributes the compression load over a wider area. For example, the support layer can be the carrier 201, the support layer 304, or the support layer 404 of the pressure pad 200, the pressure pad 300, or the pressure pad 400, respectively.

Figure 9:
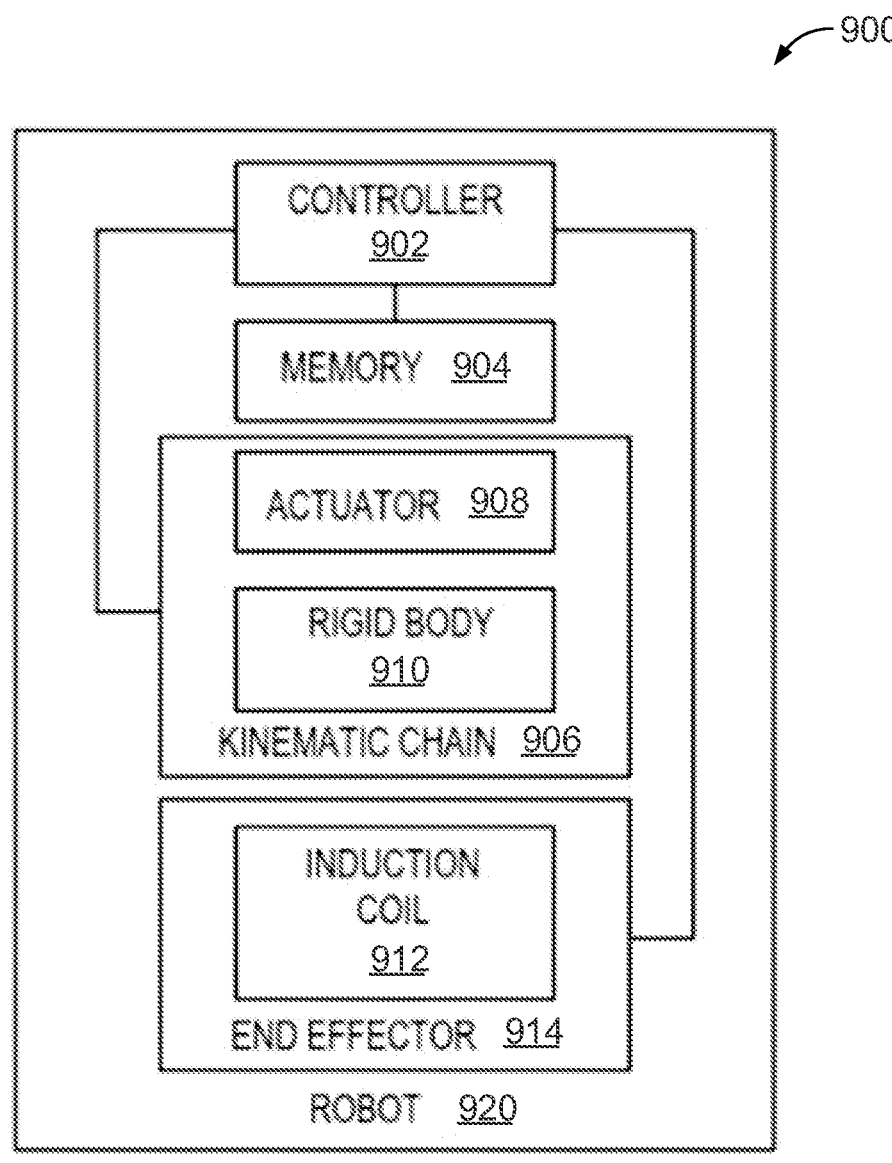
FIG. 9 illustrates an induction welding system according to various implementations of the present disclosure.

FIG. 9 illustrates a block diagram of an induction welding system 900 according to various implementations of the present disclosure. The induction welding system 900 can perform induction welding, for example, as described in the method 700 illustrated in FIG. 7. The induction welding system 900 can further be implemented, in whole or in part, in the induction welding configuration 100 illustrated in FIG. 1. The induction welding system 900 shown in FIG. 9 is for illustration only. Other implementations of the induction welding system 900 can be used without departing from the scope of the present disclosure. That is, the present disclosure contemplates induction welding system 900 having different shapes, sizes, configurations, etc.

In this example, the induction welding system 900 includes a robot 920, which has a controller 902 and a memory 904 for managing the operations of a kinematic chain 906 comprising one or more actuators 906 and one or more rigid bodies 910. By controlling the motions of kinematic chain 908, the position, speed, and/or direction of an end effector 914 bearing an induction welding coil 912 may be adjusted. In some implementations, the induction welding coil 912 is the induction welding coil 101 described in the description of FIG. 1 above. The controller 902 further controls an amount of current applied to the induction welding coil 912, in order to increase or decrease a magnetic field generated by the induction welding coil 912. This in turn controls a temperature of a weld interface 117 between the two components 113, 115 where induction welding is desired. The controller 902 can be implemented, for example, as custom circuitry, as a hardware processor executing programmed instructions, or some combination thereof. The controller 902 can further direct the operations of the various components of a robot 920 in accordance with instructions stored in a Numerical Control (NC) program stored in the memory 904.

The induction welding coil 912 generates a magnetic field at one side of the two components 113, 115 in response to applied current. The intensity of the magnetic field that is generated is based on the amount of current applied. Thus, the induction welding coil 912 is controllably adjusted in order to generate magnetic fields of desired strength.

In operation, the magnetic fields generated by induction welding coil 912 causes thermoplastic elements being welded to reach a transition temperature. For example, at the transition temperature, the thermoplastic element in the component 113 melds or welds with the thermoplastic element in the component 115. This merges the thermoplastic elements in each of the two components 113, 115 into an integral mass that cools into a single matrix of thermoplastic. The thermoplastic elements can comprise any suitable thermoplastic, such PEEK, PEKK, etc.

Figure 10:
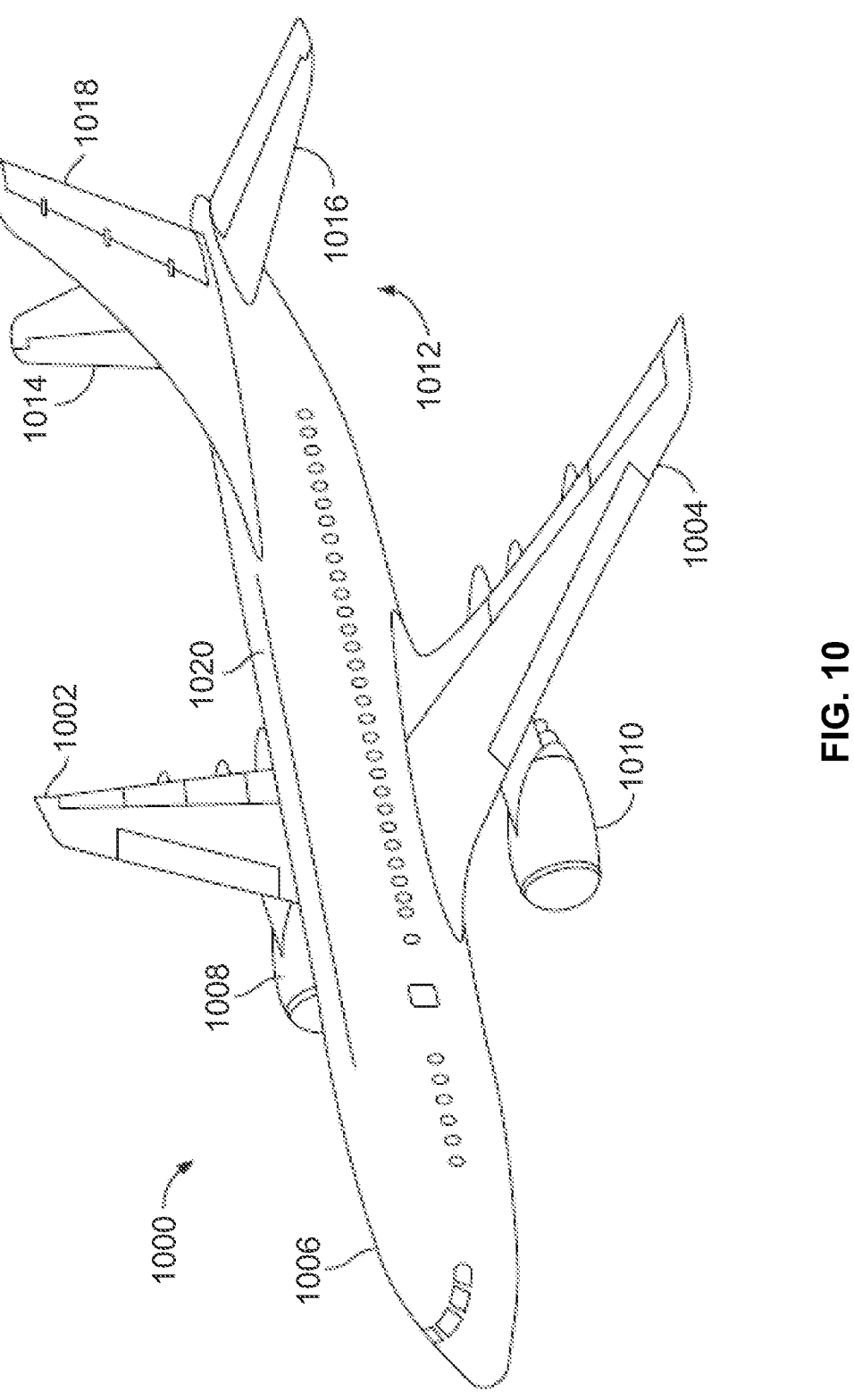
FIG. 10 illustrates a schematic perspective view of an aircraft in which induction welding can be performed according to various implementations of the present disclosure.

FIG. 10 illustrates a schematic perspective view of an aircraft in which induction welding can be performed according to various implementations of the present disclosure. One or more examples allow for fabrication of composite parts, such as thermoplastic aircraft parts for an aircraft 1000 as illustrated in FIG. 10. The aircraft 1000 includes a wing 1002 and a wing 1004 attached to a body 1006. The aircraft 1000 also includes an engine 1008 attached to the wing 1002 and an engine 1010 attached to the wing 1004. The body 1006 has a tail section 1012 with a horizontal stabilizer 1014, a horizontal stabilizer 1016, and a vertical stabilizer 1018 attached to the tail section 1012 of the body 1006. The body 1006 in some examples has a composite skin 1020.

The aircraft 1000 is an example of an aircraft in which welded thermoplastic structures can be implemented in accordance with various examples described herein. In one particular example as described in more detail herein, a composite bracket and blade stringer of the aircraft 1000 is a welded thermoplastic structure formed according to the present disclosure. In other examples, a structural support such as a spar, rib, or other structural support of the wing 1002, the wing 1004, or the body 1006 welded to another component comprises a thermoplastic structure. For example, a structural support of the body 1006 welded to the composite skin 1020 can comprise a welded thermoplastic structure.

In some examples, the present disclosure allows induction welding of different geometries or configurations of parts with magnetic flux from the induction welding coil 101 applied to only one side of the components to be welded. For example, the induction welding coil 101 allows for induction welding from one side while effectively spreading heat and pressure as described herein. For example, some or all aspects of the present disclosure can be implemented at least on the wing 1004, the body 1006, and/or the composite skin 1020 described herein.

The illustration of the aircraft 1000 is not meant to imply physical or architectural limitations to the manner in which an illustrative configurations can be implemented. For example, although the aircraft 1000 is a commercial aircraft, the aircraft 1000 can be a military aircraft, a rotorcraft, a helicopter, an unmanned aerial vehicle, or any other suitable aircraft.

Additionally, although the illustrative examples are described with respect to an aircraft, the present disclosure can be applied to other types of platforms. The platform can be, for example, a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 11:
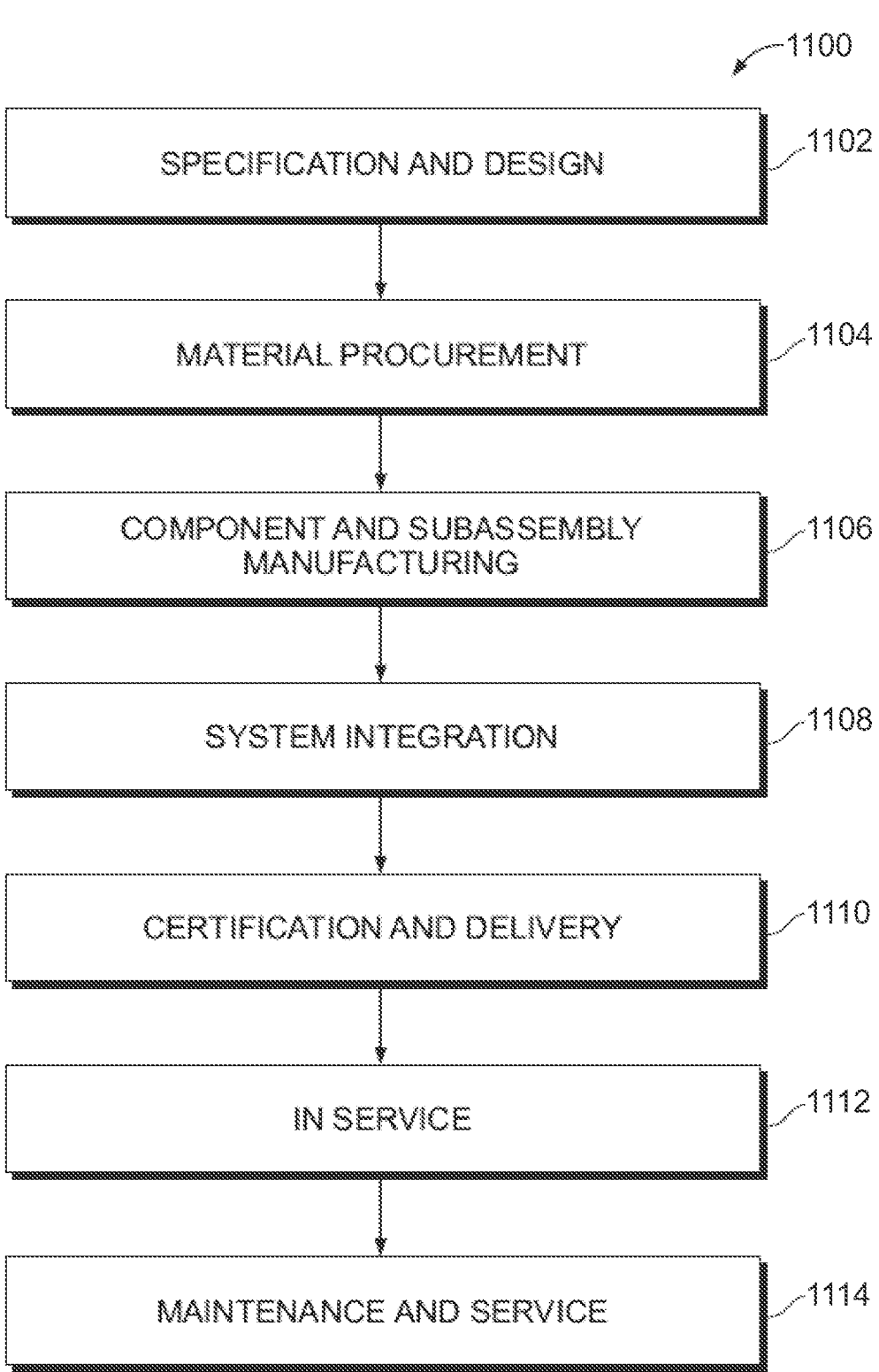
FIG. 11 illustrates a block diagram of an aircraft production and service methodology according to various implementations of the present disclosure.

FIG. 11 illustrates a block diagram of an aircraft production and service methodology in which various examples can be implemented. Examples of the disclosure can be described in the context of an aircraft manufacturing and service method 1100 as shown in FIG. 11. During preproduction, the method 1100 can include specification and design 1102 of an aircraft (e.g., the aircraft 1000 shown in FIG. 10) and material procurement 1104. During production, component and subassembly manufacturing 1106 and system integration 1108 of the aircraft take place. Thereafter, the aircraft 1000 can go through certification and delivery 1110 to be placed in service 1112. While in service by a customer, the aircraft 1000 is scheduled for routine maintenance and service 1114 (which can also include modification, reconfiguration, refurbishment, and so on).

Each of the processes of the method 1100 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as the automotive industry.

Apparatus and methods shown or described herein can be employed during any one or more of the stages of the manufacturing and service method 1100. For example, components or subassemblies corresponding to component and subassembly manufacturing 1106 can be fabricated or manufactured in a manner similar to components or subassemblies produced while the aircraft is in service. Also, one or more aspects of the apparatus, method, or combination thereof can be utilized during the production states of subassembly manufacturing 1106 and system integration 1108, for example, by substantially expediting assembly of or reducing the cost of the aircraft. Similarly, one or more aspects of the apparatus or method realizations, or a combination thereof, can be utilized, for example and without limitation, while the aircraft is in service, e.g., maintenance and service 1114.

Thus, various examples facilitate induction welding of parts by improving the heating of (e.g., more uniformly heat) the weld interface between the parts from a single side of the parts. The present disclosure, including the examples described herein, can be implemented using different manufacturing environments. For example, some or all aspects of the present disclosure can be implemented at least in the material procurement 1104 and component and assembly manufacturing 1106 as described herein.

The illustration of the manufacturing environment described herein is not meant to imply physical or architectural limitations to the manner in which an illustrative example is implemented. Other components in addition to or in place of the ones illustrated can be used. Some components can be removed. Also, the blocks are presented to illustrate some functional components. One or more of these blocks can be combined, divided, or combined and divided into different blocks when implemented in an illustrative example.

By way of example and not limitation, computer readable media comprise computer storage media and communication media can be implemented in one or more examples, such as by the controller 902. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

As indicated above, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry s which perform the specified functions, or combinations of special purpose hardware and program code instructions.

The following clauses describe further aspects of the present disclosure. In some implementations, the clauses described below can be further combined in any subcombination without departing from the scope of the present disclosure.

Clause Set A

A1: A compression load distributor comprising:
a support layer comprising a flexible carrier configured to distribute a load from a compression load applying device; and
a heat spreading layer coupled to and carried on the support layer, the heat spreading layer comprising a heat sink configured to transfer heat throughout the compression load distributor, wherein the heat sink is thermally conductive and electrically non-conductive.

A2: The compression load distributor of A1, wherein the heat sink comprises a plurality of ceramic tiles and the flexible carrier comprises a flexible plate.

A3: The compression load distributor of A1, wherein:

the flexible carrier comprises a flexible plate coupled to the compression load applying device, the heat spreading layer comprises a plurality of ceramic tiles, and the flexible plate and the plurality of ceramic tiles define a semi-rigid pad.

A4: The compression load distributor of A3, wherein the plurality of ceramic tiles are bottom-bonded to the flexible plate in a configuration to maintain an arrangement of the plurality of ceramic tiles on the flexible plate.

A5: The compression load distributor of A1, wherein the heat sink is configured to dissipate heat from a surface during induction welding, the heat generated from a magnetic flux applied to the surface by an induction welding coil.

A6: The compression load distributor of A1, wherein the heat sink comprises a plurality of ceramic tiles fabricated from aluminum nitride.

A7: The compression load distributor of A1, wherein the heat sink comprises a plurality of ceramic tiles fabricated from boron nitride (BN).

A8: The compression load distributor of A1, wherein the flexible carrier comprises a flexible plate fabricated from a glass fiber.

A9: The compression load distributor of A1, wherein the flexible carrier comprises a flexible plate fabricated from a quartz fiber or basalt fiber.

A10: The compression load distributor of A1, further comprising a polyimide film between the heat spreading layer and a surface to be induction welded.

A11: A method of fabricating a portion of an aircraft using the compression load distributor of A1.

Clause Set B

B1: A compression load distributor comprising:

a flexible carrier configured to distribute a load from a compression load applying device; and a plurality of platelets embedded within the flexible carrier and configured to transfer heat throughout the flexible carrier, wherein the plurality of platelets are thermally conductive and electrically non-conductive.

B2: The compression load distributor of B1, wherein the plurality of platelets are cooling filler platelets dispersed and aligned in-plane within the flexible carrier, the cooling filler platelets increasing a heat release capacity of the flexible carrier.

B3: The compression load distributor of B1, wherein the plurality of platelets comprises aluminum nitride.

B4: The compression load distributor of B1, wherein the plurality of platelets comprises boron nitride (BN).

B5: The compression load distributor of B1, wherein the plurality of platelets comprises a milled carbon fiber.

B6: The compression load distributor of B1, wherein the flexible carrier comprises a flexible plate fabricated from glass fiber.

B7: The compression load distributor of B1, wherein the flexible carrier comprises a flexible plate fabricated from a quartz fiber or basalt fiber.

B8: The compression load distributor of B1, wherein the plurality of platelets is embedded within the flexible carrier substantially parallel to a surface of the flexible carrier.

B9: A method of fabricating a portion of an aircraft using the compression load distributor of B1.

Clause Set C

C1: A compression load distributor comprising:

a support layer comprising a flexible carrier configured to distribute a load from a compression load applying device;

a heat spreading layer bonded to the support layer and comprising a heat sink configured to transfer heat throughout the compression load distributor, wherein the heat sink is thermally conductive and electrically non-conductive; and a silicone rubber layer, wherein the support layer is between the heat spreading layer and the silicone rubber layer.

C2: The compression load distributor of C1, wherein cross-sectional properties of at least one of the support layer and the heat spreading layer vary longitudinally.

C3: The compression load distributor of C1, wherein the flexible carrier comprises a flexible plate coupled to the compression load applying device.

C4: The compression load distributor of C1, wherein the heat sink comprises a plurality of ceramic tiles.

C5: The compression load distributor of C4, wherein the plurality of ceramic tiles comprises aluminum nitride.

C6: The compression load distributor of C4, wherein the plurality of ceramic tiles comprises boron nitride (BN).

C7: The compression load distributor of C1, further comprising a polyimide film between the support layer and the heat spreading layer.

C8: The compression load distributor of C1, wherein the flexible carrier comprises a flexible plate fabricated from a glass fiber.

C9: A method of fabricating a portion of an aircraft using the compression load distributor of C1

Clause Set D

D1: A method for maintaining a weld line temperature during induction welding, the method comprising:

applying a weld temperature to a weld line;

distributing, by a compression load distributor, a compression load across the weld line during the induction welding;

applying the weld temperature while compressing the weld line together; and drawing off a welding heat to maintain a surface temperature of a surface being inducted welded lower than the weld temperature at the weld line.

D2: The method of D1, wherein the compression load distributor includes a flexible carrier configured to distribute the compression load from a compression load applying device.

D3: The method of D2, wherein the compression load distributor includes a heat spreading layer coupled to the flexible carrier and configured to transfer welding heat from a surface at the weld line throughout the compression load distributor, and wherein the heat spreading layer is thermally conductive and electrically non-conductive.

D4: The method of D3, further comprising applying, by an induction coil, a magnetic flux that generates heat to apply the weld temperature to the weld line.

D5: A portion of an aircraft assembled according to the method of D1.

Clause Set E

E1: An apparatus for induction welding, the apparatus comprising:
    a weldable material comprising an induction weld site;
    an induction welding device on a welding side of the induction weld site; and
    a heat sink material including a welding surface proximate to a contact side of the induction weld site opposite the welding side, wherein the weldable material is arranged between the induction welding device and the heat sink material.

E2: The apparatus for induction welding of E1, further comprising a compression load applying device,
    wherein the heat sink material further comprises a pressure contact surface opposite the welding side of the induction weld site, and
    wherein the compression load applying device contacts the pressure contact surface of the heat sink material.

E3: The apparatus for induction welding of E2, wherein the heat sink material includes a flexible heat sink comprising:
    a support layer comprising a flexible carrier configured to distribute a compression load from the compression load applying device; and
    a heat spreading layer bonded to the support layer and comprising a heat sink configured to distribute heat, wherein the heat sink is thermally conductive and electrically non-conductive.

E4: The apparatus for induction welding of E3, wherein the flexible carrier is a flexible plate.

E5: A method of fabricating a portion of an aircraft using the apparatus of E1.

Clause Set F

F1: A method for manufacturing a compression load distributor, the method comprising:
    creating a mold;
    placing a heat spreading layer in the mold, the heat spreading layer comprising a heat sink configured to disperse heat, wherein the heat sink is thermally conductive and electrically non-conductive;
    applying an adhesion promoter on the heat spreading layer;
    applying a support layer on the adhesion promoter, the support layer comprising a flexible carrier configured to distribute a load; and
    curing the heat spreading layer, the adhesion promoter, and the support layer.

F2: A portion of an aircraft assembled according to the method of F1.

Clause Set G

G1: A method of distributing compression loading during induction welding, the method comprising:
    receiving pressure from a compression force applying device;
    applying a load on components to be induction welding at a weld line; and
    distributing the applied load on the components to be induction welded using a compression load distributor.

G2: A portion of an aircraft assembled according to the method of G1.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A compression load distributor for use in induction welding, the compression load distributor comprising:
   a support layer comprising a flexible carrier, wherein the support layer is configured to distribute a load from a compression load applying device;
   a heat spreading layer coupled to the support layer, the heat spreading layer comprising a heat sink, wherein the heat sink is configured to transfer heat throughout the compression load distributor, wherein the heat sink comprises a plurality of ceramic tiles with gaps between adjacent ceramic tiles to maintain flexibility of the compression load distributor, and wherein the heat sink is thermally conductive and electrically non-conductive; and
   a polyimide film covering the heat spreading layer, wherein the polyimide film is configured to contact a component during induction welding and to prevent deformation of the flexible carrier and imprinting on the component when the load is applied.

2. The compression load distributor of claim 1, wherein the plurality of ceramic tiles is embedded within the flexible carrier to form a flexible plate.

3. The compression load distributor of claim 1, wherein:
   the flexible carrier comprises a flexible plate configured to be coupled to the compression load applying device; and
   the flexible plate and the plurality of ceramic tiles define a semi-rigid pad.

4. The compression load distributor of claim 3, wherein the plurality of ceramic tiles are bottom-bonded to the flexible plate in a configuration to maintain an arrangement of the plurality of ceramic tiles on the flexible plate.

5. The compression load distributor of claim 1, wherein the heat sink is configured to dissipate heat from a surface during induction welding, the heat generated from a magnetic flux applied to the surface by an induction welding coil.

6. The compression load distributor of claim 1, wherein the plurality of ceramic tiles is fabricated from aluminum nitride.

7. The compression load distributor of claim 1, wherein the plurality of ceramic tiles is fabricated from boron nitride (BN).

8. The compression load distributor of claim 1, wherein the flexible carrier comprises a flexible plate fabricated from a glass fiber.

9. The compression load distributor of claim 1, wherein the flexible carrier comprises a flexible plate fabricated from a quartz fiber or basalt fiber.

10. A compression load distributor for use in induction welding, the compression load distributor comprising:
   a support layer comprising a flexible carrier, wherein the support layer is configured to distribute a load from a compression load applying device;
   a heat spreading layer coupled to the support layer and comprising a heat sink, wherein the heat sink is configured to transfer heat throughout the compression load distributor, wherein the heat sink is thermally conductive and electrically non-conductive;
   a polyimide film covering the heat spreading layer, wherein the polyimide film is configured to contact a component during induction welding; and
   a silicone rubber layer covering the support layer opposite the heat spreading layer, wherein the silicone rubber layer is configured to contact the compression load applying device during induction welding, wherein the support layer is positioned between the heat spreading layer and the silicone rubber layer, and wherein the silicone rubber layer is less rigid than the support layer.

11. The compression load distributor of claim 10, wherein cross-sectional properties of at least one of the support layer and the heat spreading layer vary longitudinally.

12. The compression load distributor of claim 10, wherein the flexible carrier comprises a flexible plate configured to be coupled to the compression load applying device.

13. The compression load distributor of claim 10, wherein the heat sink comprises a plurality of ceramic tiles.

14. The compression load distributor of claim 13, wherein the plurality of ceramic tiles comprises aluminum nitride.

15. The compression load distributor of claim 13, wherein the plurality of ceramic tiles comprises boron nitride (BN).

16. The compression load distributor of claim 10, wherein the flexible carrier comprises glass fiber.

17. The compression load distributor of claim 10, wherein the flexible carrier comprises quartz fiber.

18. The compression load distributor of claim 10, wherein the flexible carrier comprises basalt fiber.

19. An induction welding system comprising:
   an induction welding coil;
   a compression load applying device; and
   a compression load distributor positioned between the induction welding coil and the compression load applying device and comprising:
      a support layer comprising a flexible carrier, wherein the support layer is configured to distribute a load from the compression load applying device;
      a heat spreading layer coupled to the support layer and comprising a heat sink, wherein the heat sink is configured to transfer heat throughout the compression load distributor, wherein the heat sink comprises a plurality of ceramic tiles with gaps between adjacent ceramic tiles to maintain flexibility of the compression load distributor, and wherein the heat sink is thermally conductive and electrically non-conductive; and a polyimide film covering the heat spreading layer, wherein the polyimide film is configured to contact a component during induction welding and to prevent deformation of the flexible carrier and imprinting on the component when the load is applied.

20. The system of claim 19, wherein cross-sectional properties of at least one of the support layer and the heat spreading layer vary in at least one direction.

21. The system of claim 19, wherein the flexible carrier is coupled to the compression load applying device.

22. The system of claim 19, wherein:

the flexible carrier comprises a flexible plate configured to be coupled to the compression load applying device; and the flexible plate and the plurality of ceramic tiles define a semi-rigid pad.

23. The system of claim 19, wherein the plurality of ceramic tiles comprises aluminum nitride.

24. The system of claim 19, wherein the plurality of ceramic tiles comprises boron nitride (BN).

25. The system of claim 19, wherein the flexible carrier comprises at least one of glass fiber, quartz fiber, or basalt fiber.

\*  \*  \*  \*  \*